US012680977B2

(12) United States Patent
Meng et al.

(10) Patent No.: US 12,680,977 B2
(45) Date of Patent: Jul. 14, 2026

(54) DETACHABLE ELECTRODE HOLDER AND ELECTROPHORESIS DEVICE

(71) Applicant: SHANGHAI TANON LIFE SCIENCE CO., LTD, Shanghai (CN)

(72) Inventors: Chengwei Meng, Shanghai (CN); Zhou Yang, Shanghai (CN); Xinyuan Guo, Shanghai (CN)

(73) Assignee: SHANGHAI TANON LIFE SCIENCE CO., LTD, Shanghai (CN)

( * ) Notice: Subject to any disclaimer, the term of this patent is extended or adjusted under 35 U.S.C. 154(b) by 178 days.

(21) Appl. No.: 18/669,587

(22) Filed: May 21, 2024

(65) Prior Publication Data

US 2025/0244279 A1 Jul. 31, 2025

(30) Foreign Application Priority Data

Jan. 29, 2024 (CN) .......................... 202410124425.7

(51) Int. Cl.
*G01N 27/28* (2006.01)
*G01N 27/447* (2006.01)

(52) U.S. Cl.
CPC ..... *G01N 27/283* (2013.01); *G01N 27/44704* (2013.01)

(58) Field of Classification Search
CPC ........... G01N 27/283; G01N 27/44704; G01N 27/253; G01N 27/44713
See application file for complete search history.

(56) References Cited

U.S. PATENT DOCUMENTS 6,001,233 A * 12/1999 Levy ................ G01N 27/44704
269/236

FOREIGN PATENT DOCUMENTS

| CN | 108490059 A | * 9/2018 | ........... G01N 27/447 |
| CN | 209961731 U | 1/2020 | |
| JP | H1068714 A | 3/1998 | |

OTHER PUBLICATIONS

EPO machine-generated English language translation of Shanghai et al. CN108490059A (Year: 2018).*

* cited by examiner

*Primary Examiner* — Alexander S Noguerola
(74) *Attorney, Agent, or Firm* — Bayramoglu Law Offices LLC

(57) ABSTRACT

A detachable electrode holder is provided. The electrode holder includes a holder body, a positive electrode assembly, and a negative electrode assembly, where the holder body is provided with a mounting position; the positive electrode assembly is detachably arranged on the holder body, and the positive electrode assembly is located outside a first cavity of the holder body, and includes a positive electrode holder, a positive electrode wiring terminal arranged on the positive electrode holder, and a positive electrode wire arranged on the positive electrode holder; the negative electrode assembly is detachably arranged on the holder body and is located in the first cavity of the holder body, the negative electrode assembly is independently arranged relative to the positive electrode assembly, and the negative electrode assembly includes a negative electrode holder, a negative electrode wiring terminal arranged on the negative electrode holder, and a negative electrode wire.

26 Claims, 7 Drawing Sheets

3022

3021

3023

B

402

401

DETACHABLE ELECTRODE HOLDER AND ELECTROPHORESIS DEVICE

CROSS-REFERENCE TO THE RELATED APPLICATIONS

This application is based upon and claims priority to Chinese Patent Application No. 202410124425.7, filed on Jan. 29, 2024, the entire contents of which are incorporated herein by reference.

TECHNICAL FIELD

The present disclosure relates to the technical field of electrophoresis tanks for biological protein gels, and in particular, to a detachable electrode holder and an electrophoresis device.

BACKGROUND

In a molecular biology experiment, it is indispensable to have the experimental means to detect an experimental result by gel electrophoresis, and an electrophoresis device is an indispensable experimental tool in the experiment.

An existing electrophoresis device mainly includes a tank cover, an electrophoresis tank, and an electrode holder. The electrode holder is mainly formed by a holder and positive and negative electrode assemblies. In the prior art, the holder and the positive and negative electrode assemblies are all integrally arranged, the holder is provided with a wiring slot, and then positive and negative electrode wires are wound. When the positive and negative electrode wires or the holder is damaged, it is often necessary to replace the whole electrode holder or re-wind the positive and negative electrode wires. The positive and negative electrode wires are generally platinum wires, which break relatively easily and are not easy to wind, but replacing the whole holder is relatively high in cost.

SUMMARY

An aspect of the present disclosure provides a detachable electrode holder, which solves the problems that in the above background, an electrode holder is prone to damage, and positive and negative electrode wires are not easy to wind or replacing the whole electrode holder is high in cost. Another aspect of the present disclosure further provides an electrophoresis device.

To achieve the above objective, the present disclosure adopts the following technical solutions:

A detachable electrode holder includes:

a holder body with an open first cavity, where the holder body is provided with a mounting position;

a positive electrode assembly detachably arranged at the mounting position of the holder body, where the positive electrode assembly is located outside the first cavity of the holder body, the positive electrode assembly includes a positive electrode holder, a positive electrode wiring terminal arranged on the positive electrode holder, and a positive electrode wire arranged on the positive electrode holder, the positive electrode wire includes a first insulating section and a first exposed section, and an end of the first insulating section of the positive electrode wire is connected to the positive electrode wiring terminal; and a negative electrode assembly detachably arranged at the mounting position of the holder body, where the negative electrode assembly is partially located in the first cavity of the holder body, the negative electrode assembly is independently arranged relative to the positive electrode assembly, the negative electrode assembly includes a negative electrode holder, a negative electrode wiring terminal arranged on the negative electrode holder, and a negative electrode wire arranged on the negative electrode holder, and an end of the negative electrode wire is connected to the negative electrode wiring terminal; the negative electrode wire includes a second insulating section and a second exposed section, where the second exposed section of the negative electrode wire and the first exposed section of the positive electrode wire fit with each other in length and positionally correspond to each other, and in an electrified state, the first exposed section of the positive electrode wire and the second exposed section of the negative electrode wire can form a uniform electric field.

In some implementations, the mounting position includes a first mounting groove fitting with the positive electrode holder and a second mounting groove fitting with the negative electrode holder, the positive electrode holder is arranged in the first mounting groove, and the negative electrode holder is arranged in the second mounting groove.

In some implementations, a thickness of the positive electrode holder is less than or equal to a depth of the first mounting groove, and a thickness of the negative electrode holder is less than or equal to a depth of the second mounting groove.

In some implementations, the second mounting groove is provided close to a side of the first cavity and communicates with the first cavity; and when the negative electrode holder is mounted in the second mounting groove, the negative electrode holder is partially placed in the first cavity, and the negative electrode holder abuts against an inner wall of the first cavity.

In some implementations, the positive electrode holder is provide with a first wiring slot, and the first insulating section of the positive electrode wire is arranged in the first wiring slot.

In some implementations, a first fixing structure is arranged on a side of the first wiring slot away from the positive electrode wiring terminal, and the first exposed section of the positive electrode wire is fixedly arranged on the positive electrode holder by means of the first fixing structure.

In some implementations, the positive electrode wire and the positive electrode holder are integrally arranged.

In some implementations, the negative electrode holder is provide with a second wiring slot, and the second insulating section of the negative electrode wire is arranged in the second wiring slot.

In some implementations, a second fixing structure is arranged on a side of the second wiring slot away from the negative electrode wiring terminal, and the second exposed section of the negative electrode wire is fixedly arranged on the negative electrode holder by means of the second fixing structure.

In some implementations, the negative electrode wire and the negative electrode holder are integrally arranged.

In some implementations, the first exposed section of the positive electrode wire is horizontally arranged, and the second exposed section of the negative electrode wire is arranged in parallel relative to the first exposed section of the positive electrode wire.

In some implementations, a distance between the second exposed section of the negative electrode wire and a bottom wall of the holder body is a half of a depth of the first cavity of the holder body.

In some implementations, the holder body is provided with a sealing groove, and the sealing groove is provided with a sealing rubber strip.

In some implementations, the present disclosure further provides an electrophoresis device, including an electrophoresis tank provided with a second cavity and a second notch for communicating the second cavity with the outside; and the detachable electrode holder according to any one of the implementations described above. The electrode holder is arranged in the second cavity.

Compared with the prior art, the present disclosure has the following beneficial effects:

According to the present application, a conventional integrated electrode holder is arranged into a holder body, a positive electrode assembly and, a negative electrode assembly that are detachable, where a positive electrode holder of the positive electrode assembly is detachably arranged on the holder body, and a negative electrode holder of the negative electrode assembly is detachably arranged on the holder body, such that any one of the holder body, the positive electrode assembly, and the negative electrode assembly can be replaced without winding a positive electrode wire and a negative electrode wire or replacing the whole electrode holder, thereby reducing the replacement difficulty, making the operation simple, and reducing replacement costs.

DETAILED DESCRIPTION OF THE EMBODIMENTS

The present application is further described in detail below with reference to specific accompanying drawings. In the description of the embodiments, unless otherwise specified, orientation or position relationships indicated by terms such as "left" and "right" are orientation or position relationships based on the accompanying drawings, and are merely intended to facilitate the description of the present application and simplify the description, rather than indicating or implying that the present application must have a particular orientation and be constructed and operated in a particular orientation. Therefore, these terms should not be construed as limiting the present application.

Figure 1:
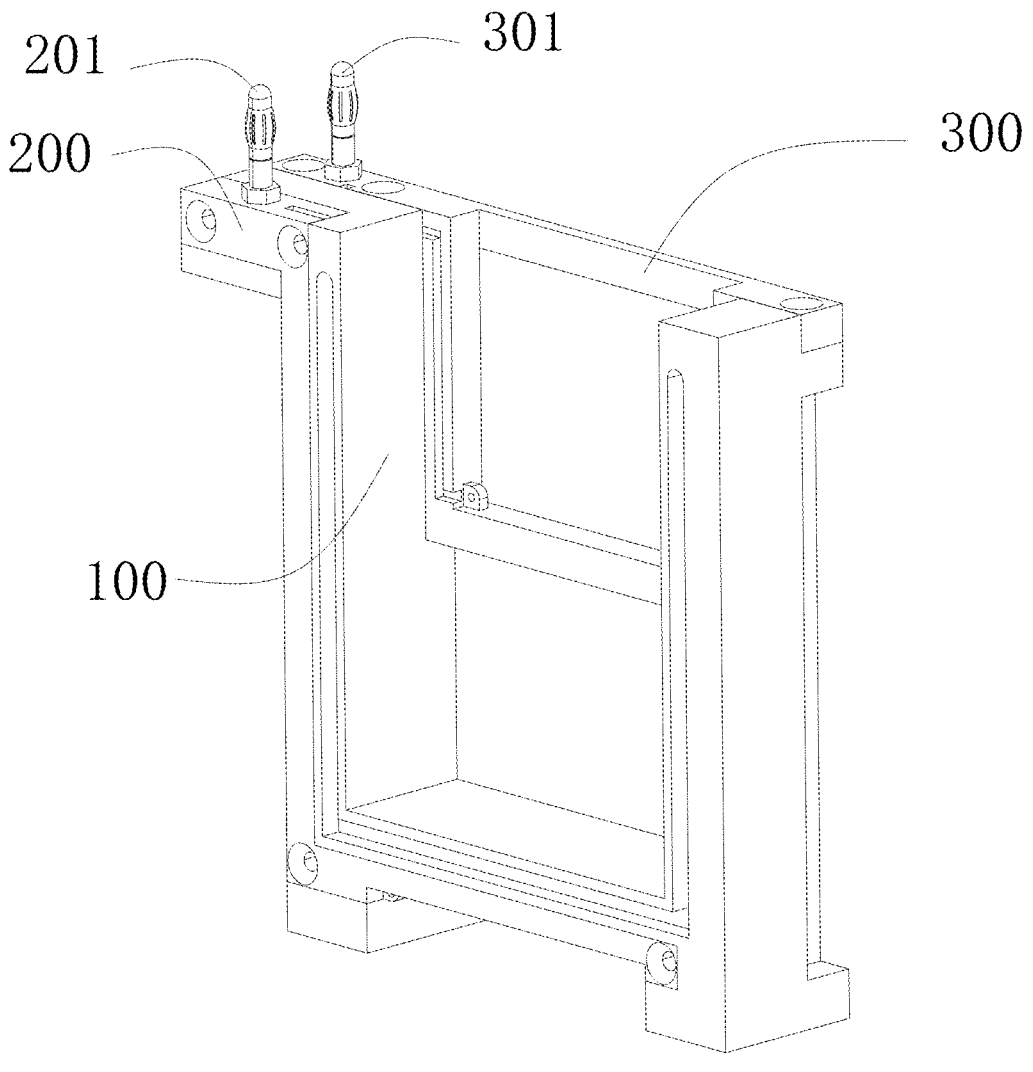
FIG. 1 is a schematic assembly diagram of a detachable electrode holder according to the present disclosure.
Figure 2:
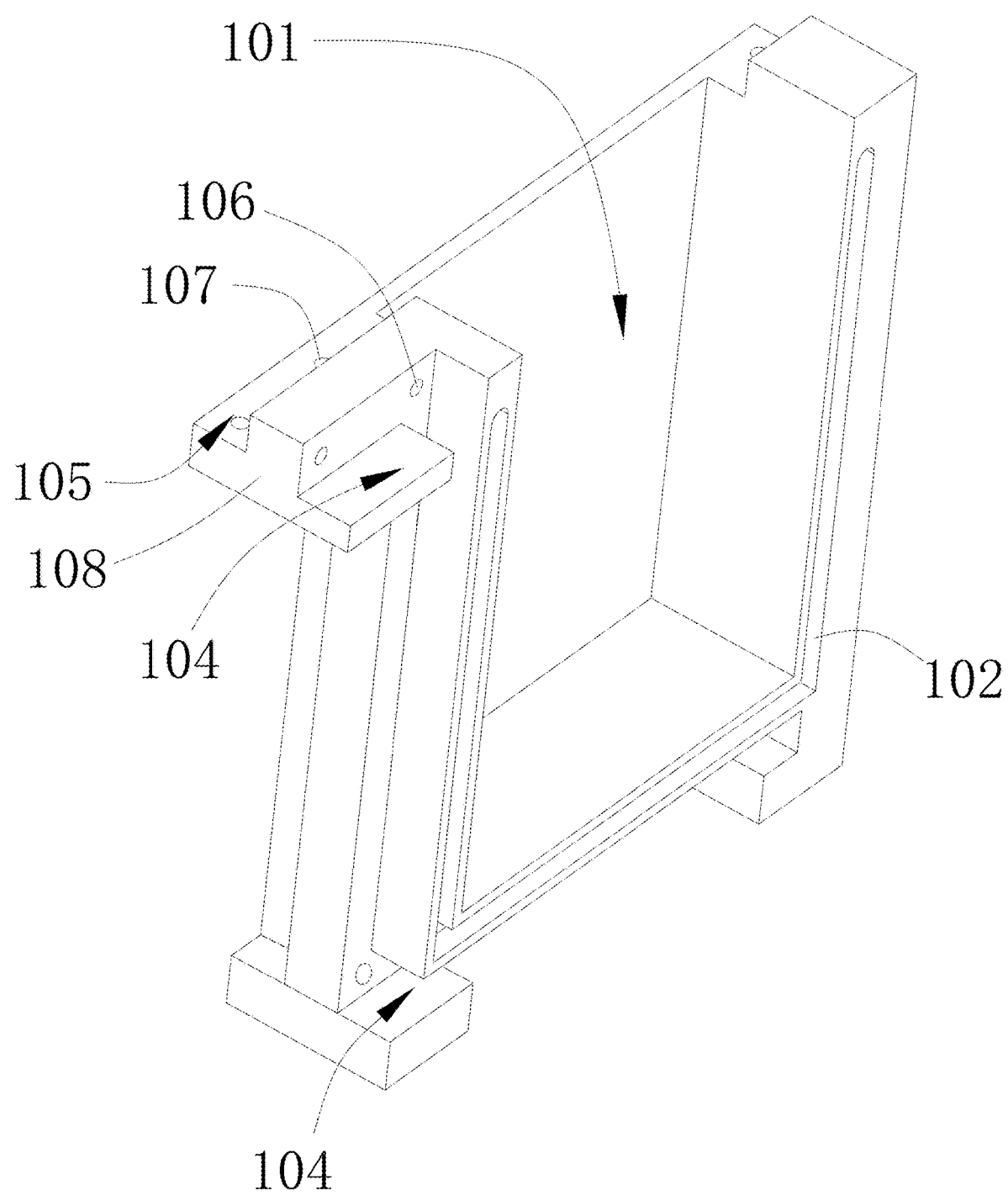
FIG. 2 is a first schematic three-dimensional structural diagram of a holder body of a detachable electrode holder according to the present disclosure.
Figure 3:
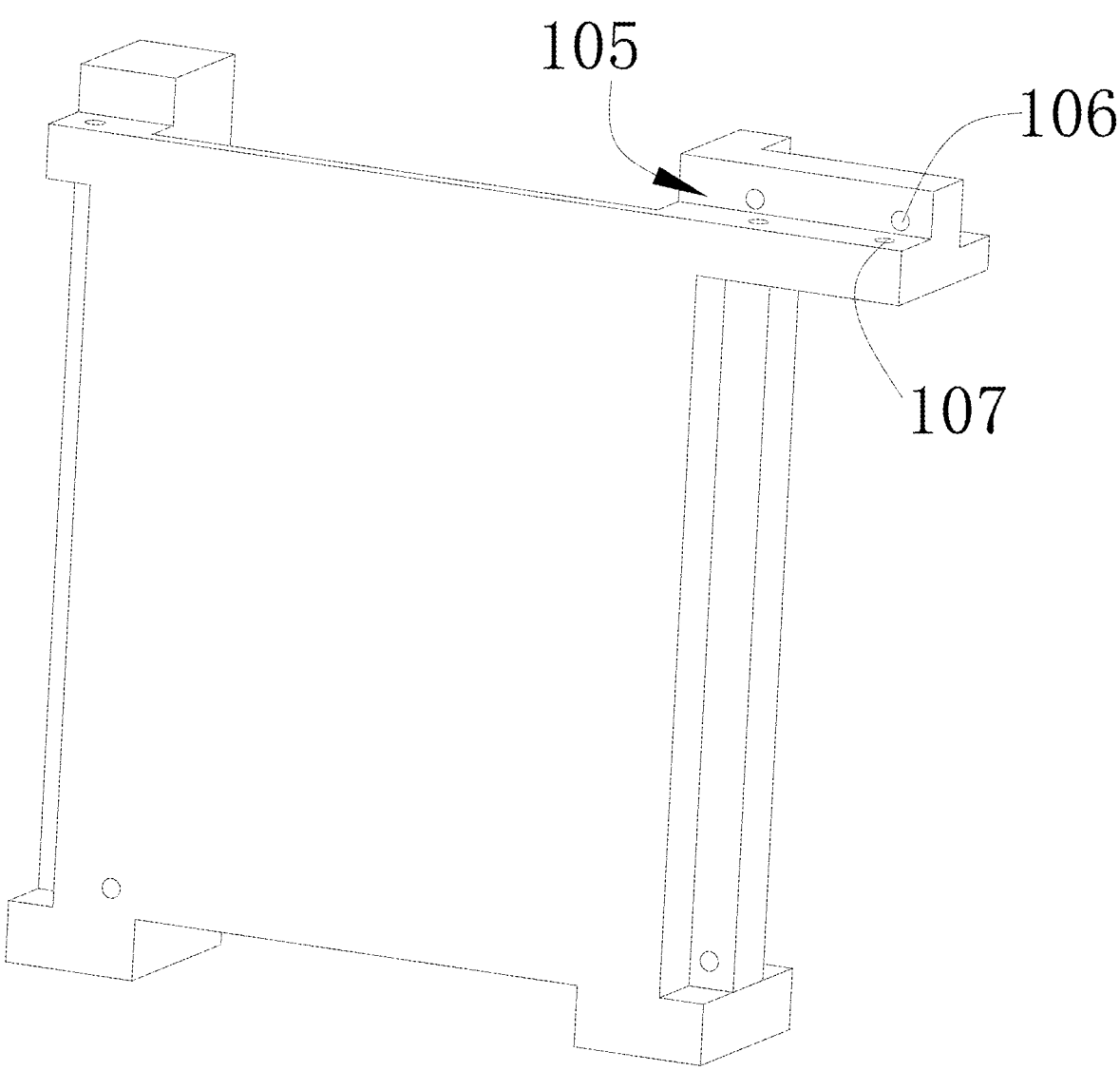
FIG. 3 is a second schematic three-dimensional structural diagram of a holder body of a detachable electrode holder according to the present disclosure.

As shown in FIGS. 1-3, a detachable electrode holder according to the present disclosure is provided, mainly including holder body 100, positive electrode assembly 200, and negative electrode assembly 300. The holder body 100 is provided with open first cavity 101, and the holder body 100 is provided with a mounting position for detachable mounting of the positive electrode assembly 200 and the negative electrode assembly 300. In this embodiment, as shown in FIG. 2, the electrode holder has a structure for placing a single rubber plate. A side wall of one side of the electrode holder has a sealed structure, and the other side thereof is in an opening shape, and is provided with corresponding sealing groove 102. The positive electrode assembly 200 is detachably arranged on the holder body 100. The positive electrode assembly 200 is located on an outer side of the first cavity 101 of the holder body 100. The positive electrode assembly 200 includes positive electrode holder 202, positive electrode wiring terminal 201 arranged on the positive electrode holder 202, and a positive electrode wire arranged on the positive electrode holder 202. The positive electrode wire is formed by a first insulating section and a first exposed section. An end of the first insulating section of the positive electrode wire is electrically connected to the positive electrode wiring terminal 201, and the first exposed section of the positive electrode wire is fixed to an outer side of the positive electrode holder 202. The negative electrode assembly 300 is detachably arranged on the holder body 100. Negative electrode holder 302 is located in the first cavity 101 of the holder body 100. The negative electrode assembly 300 is independently arranged relative to the positive electrode assembly 200, that is, the negative electrode assembly 300 is not electrically connected to the positive electrode assembly 200. The negative electrode assembly 300 includes the negative electrode holder 302, negative electrode wiring terminal 301 arranged on the negative electrode holder 302, and a negative electrode wire arranged on the negative electrode holder 302. The negative electrode wire is formed by a second insulating section and a second exposed section. An end of the second insulating section of the negative electrode wire is electrically connected to the negative electrode wiring terminal 301. The second exposed section of the negative electrode wire and the first exposed section of the positive electrode wire match each other in length and correspond to each other in mounting position, and in an electrified state, the first exposed section of the positive electrode wire and the second exposed section of the negative electrode wire can form a uniform electric field to meet experimental requirements. In this embodiment, the positive electrode wire and the negative electrode wire are both platinum wires. In order to reduce experimental costs, the first insulating section of the positive electrode wire and the second insulating section of the negative electrode wire may be other metal conductors that can be electrified, such as copper or silver. The first exposed section of the positive electrode wire and the second exposed section of the negative electrode wire are both platinum wires.

In the present application, a conventional electrode holder with an integrated structure is split into the holder body 100, the positive electrode assembly 200, and the negative electrode assembly 300 that are detachably connected to each other, such that when a component of the electrode holder is damaged, there is no need to wind and assemble platinum wires or replace the whole electrode holder, a process of component replacement is simplified, and an experimenter can disassemble and replace the corresponding component with no need to return the product to a factory for repair, thereby reducing experimental costs.

In an embodiment, as shown in FIG. 2, the mounting position includes first mounting groove 104 and second mounting groove 105 that are provided in the holder body 100. The first mounting groove 104 fits with the positive electrode holder 202, and the second mounting groove 105 fits with the negative electrode holder 302. The positive electrode holder 202 is mounted in the first mounting groove 104, and the negative electrode holder 302 is mounted in the second mounting groove 105. Specifically, in this embodiment, the positive electrode holder 202 is a Z-shaped mechanism, which can be bridged from an upper end of the holder body 100 to a lower end of the holder body 100, such that the positive electrode wire can reach an outer side of the lower end of the holder body 100. The first mounting groove 104 also has a Z-shaped structure, with a size fitting with that of the positive electrode holder 202. The positive electrode holder 202 is snap-fitted in the first mounting groove 104. The positive electrode holder 202 is provided with a plurality of first through holes 2022, and the holder body 100 is provided with a plurality of corresponding first threaded holes 106. The positive electrode holder 202 is fixed to the holder body 100 by means of screws. The second mounting groove 105 has a straight-line-shaped structure, which spans two side walls of the holder body 100, such that the second exposed section of the negative electrode wire can extend from one side wall of the first cavity 101 to the other opposite side wall, and thus a precast gel on the rubber plate is covered by the electric field. The negative electrode holder 302 is provided with a plurality of second through holes 3022, and the holder body 100 is provided with corresponding second threaded holes 107. The negative electrode holder 302 is locked and fixed to the holder body 100 by means of screws. In this embodiment, in order to facilitate direct mounting of the negative electrode wire in the first cavity 101, the second mounting groove 105 extends to an inner wall of the first cavity 101 and communicates with the first cavity 101.

Figure 5:
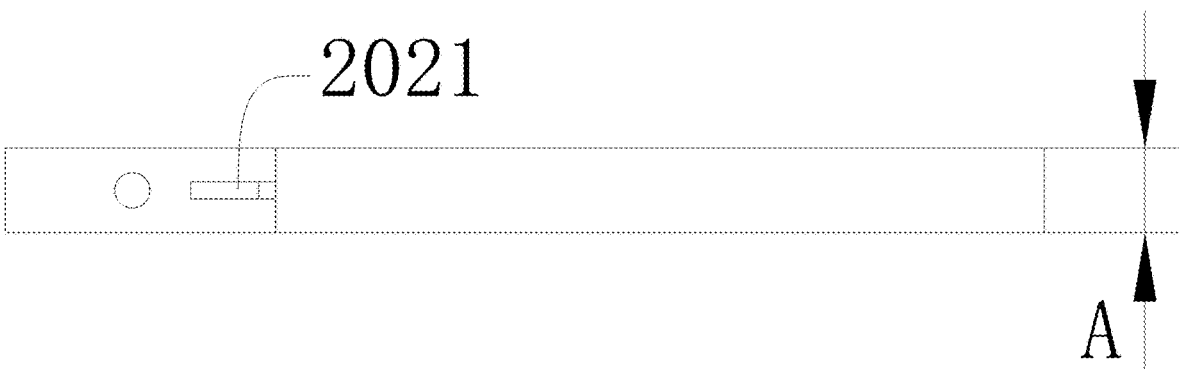
FIG. 5 is a top view of a positive electrode holder of a detachable electrode holder according to the present disclosure.
Figure 7:
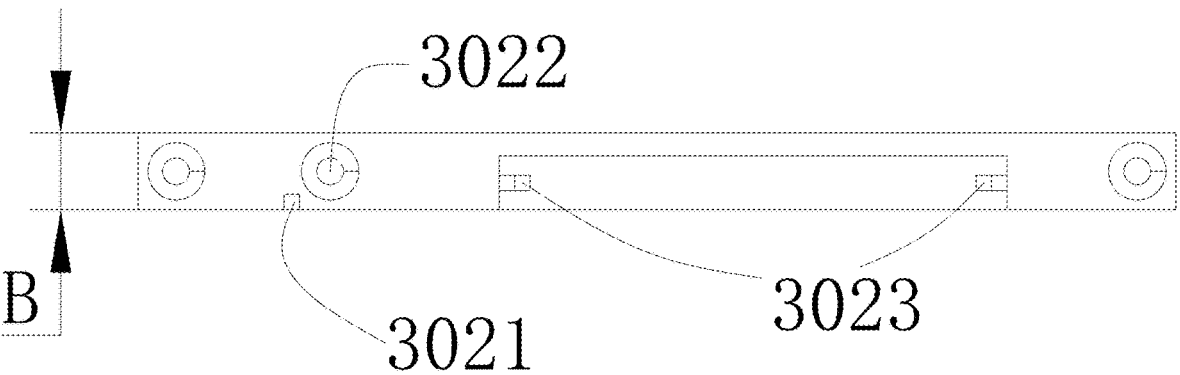
FIG. 7 is a top view of a negative electrode holder of a detachable electrode holder according to the present disclosure.

Further, as shown in FIGS. 1 and 5, in order to facilitate assembly of the whole electrode holder, a thickness A of the positive electrode holder 202 is less than or equal to a depth of the first mounting groove 104. That is, when the positive electrode holder 202 is mounted in the first mounting groove 104, the positive electrode holder 202 does not protrude from a side surface of the holder body 100. In this embodiment, in a preferred assembly method, the thickness of the positive electrode holder 202 is consistent with the depth of the first mounting groove 104, such that the positive electrode holder 202 can be limited, supported and fixed when the electrode holder is mounted, and there is no need to provide a complicated notch when the electrode holder is mounted. Similarly, as shown in FIGS. 1 and 7, a thickness B of the negative electrode holder 302 is also the same as the depth of the second mounting groove 105, in the same principle as the positive electrode holder 202, which is not excessively repeated herein.

Further, since a part of the negative electrode holder 302 needs to be mounted in the first cavity 101, in order to make the mounted structure of the negative electrode holder 302 more stable, when the part of the negative electrode holder 302 is placed in the first cavity 101, the negative electrode holder 302 located in the first cavity 101 abuts against the inner wall of the first cavity 101 of the holder body 100, such that the negative electrode holder can be directly positioned by allowing the negative electrode holder 302 to abut against the inner wall of the first cavity 101, thereby preventing the negative electrode holder 302 from moving relative to the holder body 100.

Figure 4:
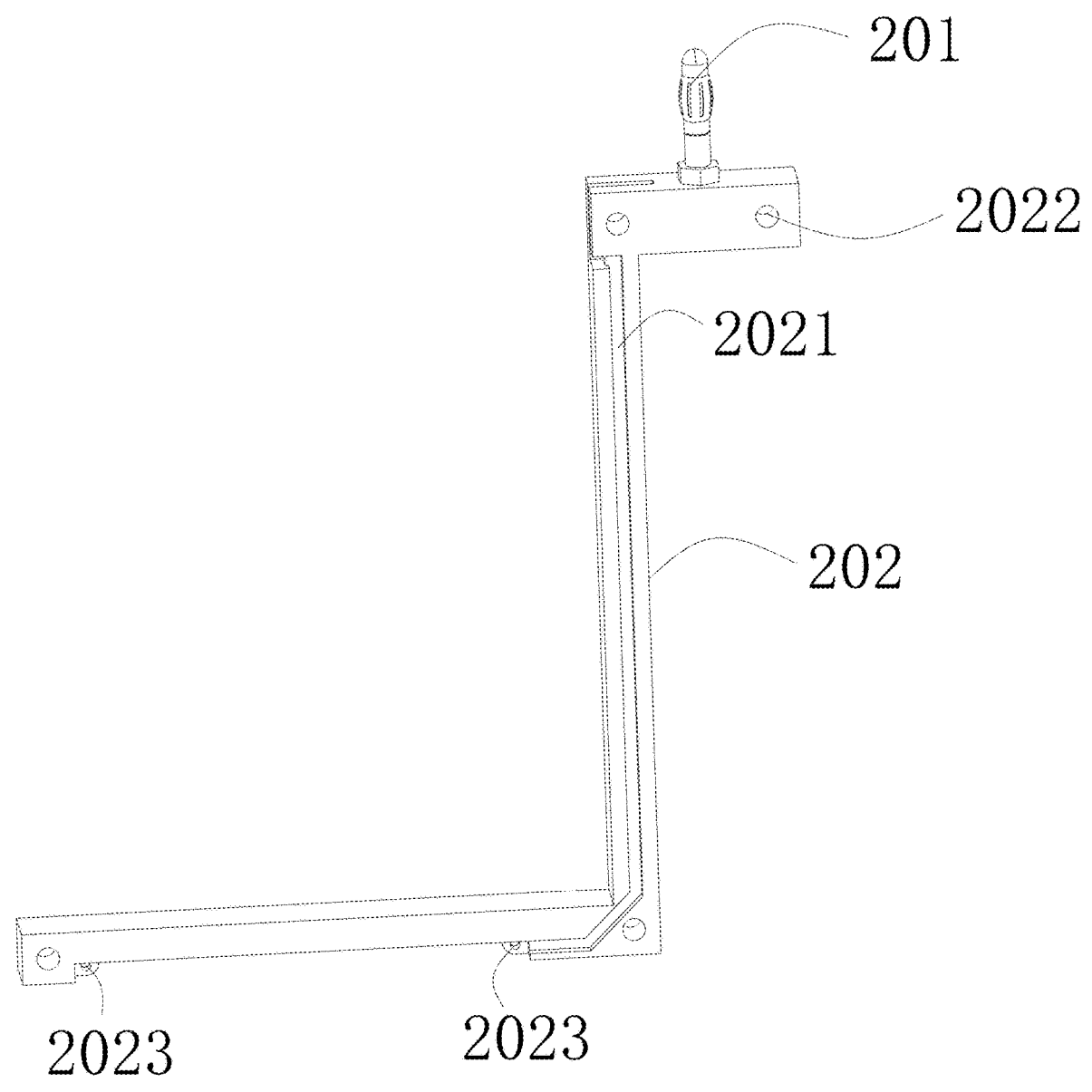
FIG. 4 is a schematic three-dimensional structural diagram of a positive electrode holder of a detachable electrode holder according to the present disclosure.

In an embodiment, in order to facilitate the mounting and winding of the positive electrode wire on the positive electrode holder 202, as shown in FIG. 4, the positive electrode holder 202 is provided with first wiring slot 2021, and the first wiring slot 2021 is distributed in an axial direction of the positive electrode holder 202. The first wiring slot 2021 is provided on a side of the positive electrode holder 202 close to the holder body 100, and the first insulating section of the positive electrode wire is located in the first wiring slot 2021. When the positive electrode holder 202 is mounted on the holder body 100, the holder body 100 covers the first wiring slot 2021, to further insulate the positive electrode wire. Further, in order to fix the first exposed section of the positive electrode wire, first fixing structure 2023 is arranged on a side of the first wiring slot 2021 away from the positive electrode wiring terminal 201, and the first exposed section of the positive electrode wire is fixed to an outer side of the holder body 100 by means of the first fixing structure 2023. Specifically, in this embodiment, the first fixing structure 2023 is two first fixing holes, and the two first fixing holes are provided with a preset distance therebetween. When the first exposed section of the positive electrode wire is fixed to the first fixing structure, the precast gel of the rubber plate can be coated inside, so as to meet test requirements. Optionally, the first fixing hole may alternatively be provided in the form of a fixing column, and it can be known that the shape and structure of the first fixing structure 2023 are not limited by the present disclosure. In order to further simplify an assembly process, the positive electrode wire and the positive electrode holder 202 are arranged into an integrated structure, that is, the first insulating section of the positive electrode wire is embedded in the positive electrode holder 202, and the protection for the first insulating section of the positive electrode wire can be further improved.

Figure 6:
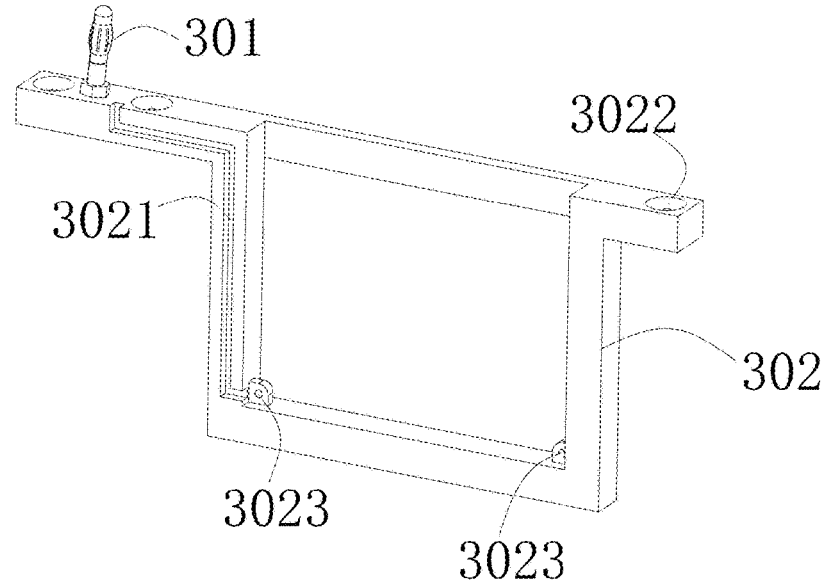
FIG. 6 is a schematic three-dimensional structural diagram of a negative electrode holder of a detachable electrode holder according to the present disclosure.

In an embodiment, similarly, in order to facilitate the mounting and winding of the negative electrode wire on the negative electrode holder 302, as shown in FIG. 6, the negative electrode holder 302 is provide with second wiring slot 3021, and the second insulating section of the negative electrode wire is arranged in the second wiring slot 3021. Specifically, the second wiring slot 3021 is provided on a side of the negative electrode holder 302 close to the holder body 100. When the negative electrode holder 302 is mounted on the holder body 100, the holder body 100 covers the second wiring slot 3021 to further insulate the negative electrode wire. Further, second fixing structure 3023 is arranged on a side of the second wiring slot 3021 away from the negative electrode wiring terminal 301, and the second exposed section of the negative electrode wire is fixedly arranged on the negative electrode holder 302 by means of the second fixing structure 3023. With the arrangement of the second fixing structure 3023, the second exposed section of the negative electrode wire is fixed, such that the second exposed section of the negative electrode wire and the first exposed section of the positive electrode wire are correspondingly arranged. After electrification, the first exposed section of the positive electrode wire and the second exposed section of the negative electrode wire can form a uniform and stable electric field. In this embodiment, the second fixing structure 3023 is two second fixing holes spaced apart, and optionally, the second fixing structure 3023 may be alternatively in the form of fixing columns spaced apart. Further, the negative electrode wire and the negative electrode holder 302 may be alternatively arranged into an integrated structure, that is, the second insulating section of the negative electrode wire is embedded in the negative electrode holder 302, which simplifies replacement of accessories, further improves the protection for the second insulating section of the negative electrode wire, and prolongs the service life of the second insulating section.

In an embodiment, referring to FIG. 1 again, in order to ensure that a relatively stable and balanced electric field is provided, the first exposed section of the positive electrode wire is horizontally arranged, and the second exposed section of the negative electrode wire is arranged in parallel relative to the first exposed section of the positive electrode wire. Further, in order to achieve a better gel running experiment effect, since a gel running experiment is sensitive to temperature, to avoid the influence of temperature concentration on a gel running result, it is concluded by the experiment that, a distance between the second exposed section of the negative electrode wire and a bottom wall of the holder body 100 is a half of a depth of the first cavity 101 of the holder body 100. In this embodiment, the positive electrode wire is attached to a bottom wall of the outer side of the holder body 100.

In an embodiment, the holder body 100 is provided with a sealing groove, and the sealing groove 102 is provided with a sealing rubber strip. Specifically, in this embodiment, for a gel running experiment of the precast gel on the single rubber plate, the sealing groove 102 is provided only on one side of the holder body 100, and the other side of the holder body 100 is provided with an integrated side wall for sealing. Optionally, when two rubber plates are arranged on two sides, as shown in FIG. 2, a side wall of a side of the holder body 100 close to the second mounting groove 105 is removed, and sealing grooves 102 and the sealing rubber strips are provided, such that the gel running experiment of the two rubber plates can be performed. Further, the sealing rubber strips are detachably arranged on the sealing grooves 102. Different step structures are pre-arranged on a side of each sealing rubber strip close to an opening of the holder body 100, to match rubber plates commonly used in the market at present so as to match hand-poured gels and precast gels with different sizes. The hand-poured gels and the precast gels each have dimensions of 80 mm*100 mm and 100 mm*100 mm. When the hand-poured gels or precast gels with different sizes are arranged on the rubber plates, different boss structures are formed on the rubber plates. In order to ensure sealing performance of the rubber plates with the hand-poured gels or precast gels with two different sizes, corresponding step structures are pre-arranged on the sealing rubber strips, and sealing rubber strips with step structures of different heights are selectively mounted according to experimental requirements.

Figure 8:
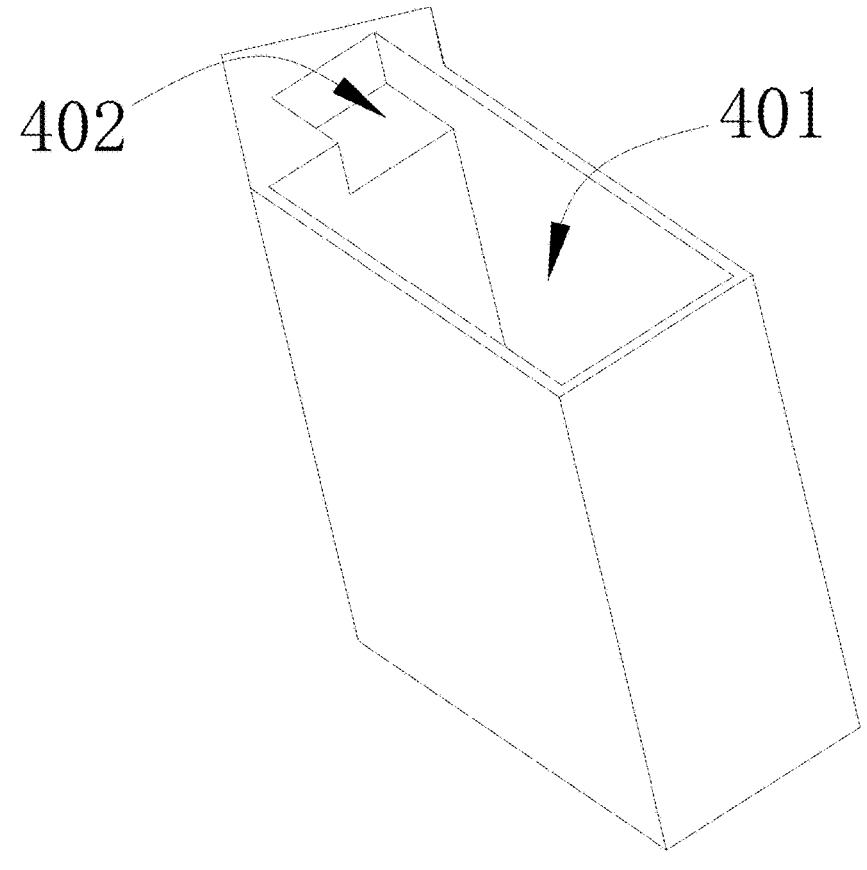
FIG. 8 is a schematic three-dimensional structural diagram of an electrophoresis tank of an electrophoresis device according to the present disclosure.
Figure 9:
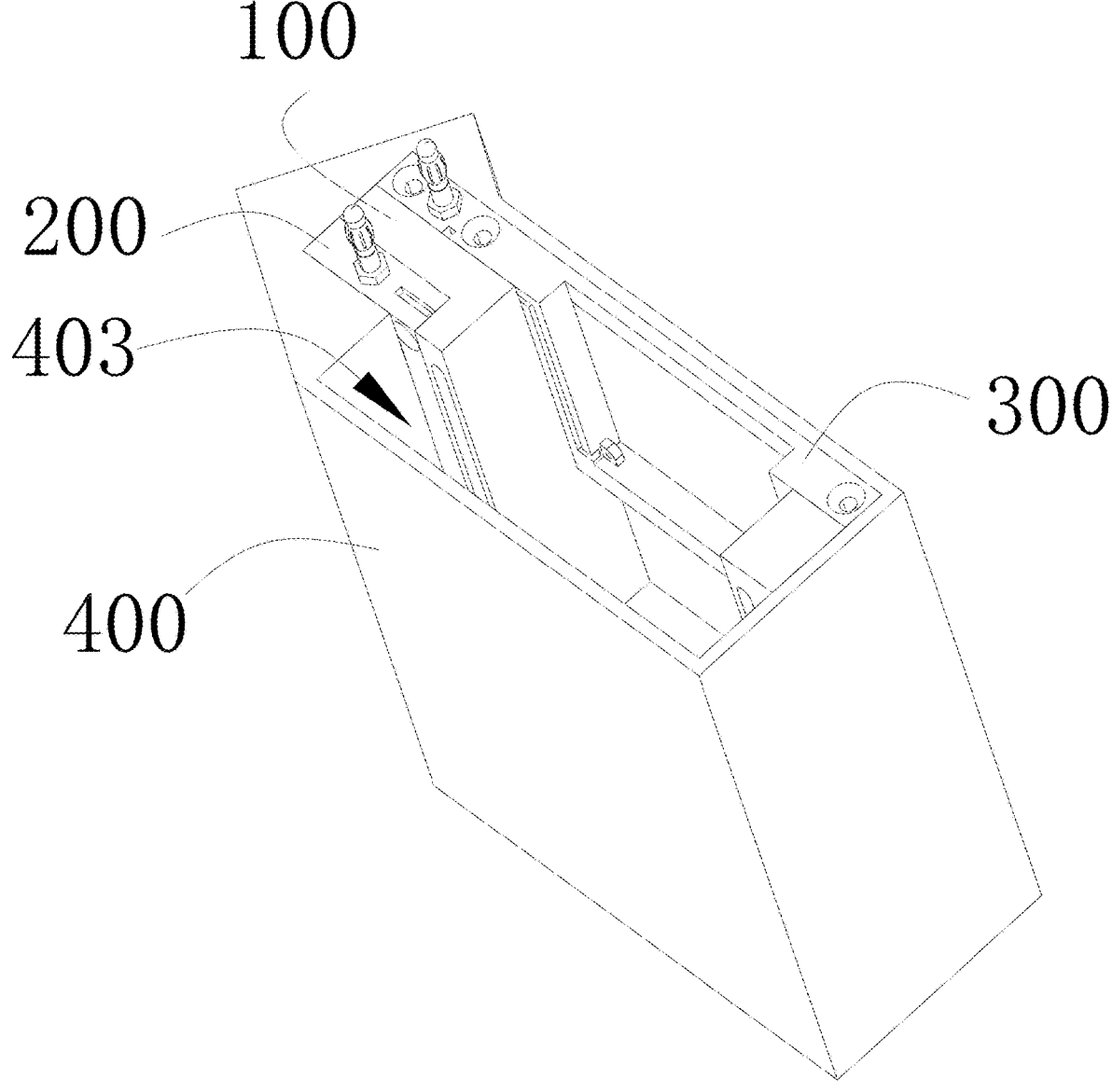
FIG. 9 is a schematic structural diagram illustrating mounting of an assembled electrode holder in an electrophoresis tank according to the present disclosure.

In an embodiment, as shown in FIGS. 8-10, the present disclosure further provides an electrophoresis device, which includes electrophoresis tank 400 provided with second cavity 401 and a second notch for communicating the second cavity 401 with the outside; and the detachable electrode holder according to any one of the embodiments described above, where the electrophoresis tank 400 is provided with first positioning groove 402, and the electrode holder is arranged in the second cavity 401. The holder body 100 is provided with first positioning boss 108, and the first positioning boss 108 fits with the first positioning groove 402. When the electrode holder is arranged in the electrophoresis tank 400, an upper end surface of the electrode holder is not higher than an upper end surface of the electrophoresis tank 400. When the electrode holder is mounted in the second cavity 401, preset distance 403 is provided between the electrode holder and an inner wall of the electrophoresis tank 400 to mount a rubber plate.

The above descriptions are merely preferred implementations of the present disclosure. It should be noted that those of ordinary skill in the art may further make several improvements and modifications without departing from the principle of the present disclosure. These improvements and modifications shall also fall within the protection scope of the present disclosure.

What is claimed is:

1. A detachable electrode holder, comprising:
a holder body with an open first cavity, wherein the holder body is provided with a mounting position;
a positive electrode assembly detachably arranged at the mounting position of the holder body, wherein the positive electrode assembly is located outside the first cavity of the holder body, the positive electrode assembly comprises a positive electrode holder, a positive electrode wiring terminal arranged on the positive electrode holder, and a positive electrode wire arranged on the positive electrode holder, the positive electrode wire comprises a first insulating section and a first exposed section, and an end of the first insulating section of the positive electrode wire is connected to the positive electrode wiring terminal; and
a negative electrode assembly detachably arranged at the mounting position of the holder body, wherein the negative electrode assembly is partially located in the first cavity of the holder body, the negative electrode assembly is independently arranged relative to the positive electrode assembly, the negative electrode assembly comprises a negative electrode holder, a negative electrode wiring terminal arranged on the negative electrode holder, and a negative electrode wire arranged on the negative electrode holder, and an end of the negative electrode wire is connected to the negative electrode wiring terminal; the negative electrode wire comprises a second insulating section and a second exposed section, wherein, in an electrified state, the first exposed section of the positive electrode wire and the second exposed section of the negative electrode wire form a uniform electric field.

2. The detachable electrode holder according to claim 1, wherein the mounting position comprises a first mounting groove fitting with the positive electrode holder and a second mounting groove fitting with the negative electrode holder, the positive electrode holder is arranged in the first mounting groove, and the negative electrode holder is arranged in the second mounting groove.

3. The detachable electrode holder according to claim 2, wherein a thickness of the positive electrode holder is less than or equal to a depth of the first mounting groove, and a thickness of the negative electrode holder is less than or equal to a depth of the second mounting groove.

4. An electrophoresis device, comprising:
an electrophoresis tank provided with a second cavity and a notch for communicating the second cavity with an outside of the second cavity; and the detachable electrode holder according to claim 3, wherein the detachable electrode holder is arranged in the second cavity.

5. An electrophoresis device, comprising:

an electrophoresis tank provided with a second cavity and a notch for communicating the second cavity with an outside of the second cavity; and the detachable electrode holder according to claim 2, wherein the detachable electrode holder is arranged in the second cavity.

6. The detachable electrode holder according to claim 2, wherein the second mounting groove is provided adjacent to a side of the first cavity and communicates with the first cavity; and when the negative electrode holder is mounted in the second mounting groove, the negative electrode holder is partially placed in the first cavity, and the negative electrode holder abuts against an inner wall of the first cavity.

7. An electrophoresis device, comprising:

an electrophoresis tank provided with a second cavity and a notch for communicating the second cavity with an outside of the second cavity; and the detachable electrode holder according to claim 6, wherein the detachable electrode holder is arranged in the second cavity.

8. The detachable electrode holder according to claim 1, wherein the positive electrode holder is provide with a first wiring slot, and the first insulating section of the positive electrode wire is arranged in the first wiring slot.

9. The detachable electrode holder according to claim 8, wherein a first fixing structure is arranged on a side of the first wiring slot away from the positive electrode wiring terminal, and the first exposed section of the positive electrode wire is fixedly arranged on the positive electrode holder by means of the first fixing structure.

10. An electrophoresis device, comprising:

an electrophoresis tank provided with a second cavity and a notch for communicating the second cavity with an outside of the second cavity; and the detachable electrode holder according to claim 9, wherein the detachable electrode holder is arranged in the second cavity.

11. An electrophoresis device, comprising:

an electrophoresis tank provided with a second cavity and a notch for communicating the second cavity with an outside of the second cavity; and the detachable electrode holder according to claim 8, wherein the detachable electrode holder is arranged in the second cavity.

12. The detachable electrode holder according to claim 1, wherein the positive electrode wire and the positive electrode holder are integrally arranged.

13. An electrophoresis device, comprising:

an electrophoresis tank provided with a second cavity and a notch for communicating the second cavity with an outside of the second cavity; and the detachable electrode holder according to claim 12, wherein the detachable electrode holder is arranged in the second cavity.

14. The detachable electrode holder according to claim 1, wherein the negative electrode holder is provided with a second wiring slot, and the second insulating section of the negative electrode wire is arranged in the second wiring slot.

15. The detachable electrode holder according to claim 14, wherein a second fixing structure is arranged on a side of the second wiring slot away from the negative electrode wiring terminal, and the second exposed section of the negative electrode wire is fixedly arranged on the negative electrode holder by means of the second fixing structure.

16. An electrophoresis device, comprising:

an electrophoresis tank provided with a second cavity and a notch for communicating the second cavity with an outside of the second cavity; and the detachable electrode holder according to claim 15, wherein the detachable electrode holder is arranged in the second cavity.

17. An electrophoresis device, comprising:

an electrophoresis tank provided with a second cavity and a notch for communicating the second cavity with an outside of the second cavity; and the detachable electrode holder according to claim 14, wherein the detachable electrode holder is arranged in the second cavity.

18. The detachable electrode holder according to claim 1, wherein the negative electrode wire and the negative electrode holder are integrally arranged.

19. An electrophoresis device, comprising:

an electrophoresis tank provided with a second cavity and a notch for communicating the second cavity with an outside of the second cavity; and the detachable electrode holder according to claim 18, wherein the detachable electrode holder is arranged in the second cavity.

20. The detachable electrode holder according to claim 1, wherein the first exposed section of the positive electrode wire is horizontally arranged, and the second exposed section of the negative electrode wire is arranged in parallel relative to the first exposed section of the positive electrode wire.

21. The detachable electrode holder according to claim 20, wherein a distance between the second exposed section of the negative electrode wire and a bottom wall of the holder body is a half of a depth of the first cavity of the holder body.

22. An electrophoresis device, comprising:

an electrophoresis tank provided with a second cavity and a notch for communicating the second cavity with an outside of the second cavity; and the detachable electrode holder according to claim 21, wherein the detachable electrode holder is arranged in the second cavity.

23. An electrophoresis device, comprising:

an electrophoresis tank provided with a second cavity and a notch for communicating the second cavity with an outside of the second cavity; and the detachable electrode holder according to claim 20, wherein the detachable electrode holder is arranged in the second cavity.

24. The detachable electrode holder according to claim 1, wherein the holder body is provided with a sealing groove, and the sealing groove is provided with a sealing rubber strip.

25. An electrophoresis device, comprising:

an electrophoresis tank provided with a second cavity and a notch for communicating the second cavity with an outside of the second cavity; and the detachable electrode holder according to claim 24, wherein the detachable electrode holder is arranged in the second cavity.

26. An electrophoresis device, comprising:

an electrophoresis tank provided with a second cavity and a notch for communicating the second cavity with an outside of the second cavity; and the detachable electrode holder according to claim 1, wherein the detachable electrode holder is arranged in the second cavity.

\* \* \* \* \*